United States Patent
Sommer

Patent Number: 5,657,843
Date of Patent: Aug. 19, 1997

[54] PRESS DRIVE WITH OIL SHEAR CLUTCH/ BRAKE DRIVES

[75] Inventor: Gordon Maurice Sommer, Grosse Pointe Farms, Mich.

[73] Assignee: Midwest Brake Bond Company, Warren, Mich.

[21] Appl. No.: 523,279

[22] Filed: Sep. 5, 1995

[51] Int. Cl.$^6$ .................................................. F16D 67/04
[52] U.S. Cl. ................ 192/18 A; 192/12 C; 192/85 AA
[58] Field of Search ........................ 192/18 A, 12 C, 192/85 A, 85 AA

[56] References Cited

U.S. PATENT DOCUMENTS

| | | | |
|---|---|---|---|
| 2,870,655 | 1/1959 | Rockwell | 192/18 A X |
| 3,077,252 | 2/1963 | Treer | 192/18 A X |
| 3,182,776 | 5/1965 | Sommer | 192/18 A |
| 3,494,450 | 2/1970 | Mankowsky et al. | 192/18 A |
| 3,605,963 | 9/1971 | Roob et al. | 192/18 A |
| 3,614,999 | 10/1971 | Sommer | |
| 3,713,517 | 1/1973 | Sommer | |
| 3,835,971 | 9/1974 | Spanke et al. | |
| 3,946,840 | 3/1976 | Sommer | |
| 4,122,926 | 10/1978 | Spanke et al. | 192/18 A |
| 4,135,611 | 1/1979 | Spanke | |
| 4,186,827 | 2/1980 | Spanke | |
| 4,432,443 | 2/1984 | Sommer | |
| 4,472,077 | 9/1984 | Sommer | |
| 4,785,926 | 11/1988 | Matson | |
| 5,190,129 | 3/1993 | Sommer | |
| 5,462,147 | 10/1995 | Sherman | 192/18 A |

Primary Examiner—Andrea L. Pitts
Attorney, Agent, or Firm—Harness, Dickey & Pierce

[57] ABSTRACT

A drive unit for driving a press is disclosed. The drive unit uses a hydraulically actuated oil shear brake unit located on one side of a flywheel and a hydraulically actuated oil shear clutch unit located on the opposite side if the flywheel. The brake is normally biased into its applied condition and the clutch is normally biased into its disengaged position. The engagement of the clutch and the release of the brake occur from the same hydraulic pressure source. The amount of overlap between the two units is accurately controlled by varying the biasing loads of the assemblies and accurately setting the stroke of the actuation member for each assembly.

4 Claims, 1 Drawing Sheet

PRESS DRIVE WITH OIL SHEAR CLUTCH/BRAKE DRIVES

FIELD OF THE INVENTION

The present invention relates to press drives. More particularly the present invention relates to a single speed press drive using an oil shear clutch unit and an oil shear brake. The operation of the clutch is controlled with respect to the operation of the brake to provide a specified amount of overlap between the operation of these two components.

BACKGROUND OF THE INVENTION

Dry friction clutch/brakes depend upon the rubbing of a dry friction material against dry reaction members to start and stop a press. This continuous rubbing causes wearing of both the friction material and the reaction members as well as causing the generation of heat in these members. The faster the press operates and the faster the flywheel rotates, greater is the amount of wear and heat which are generated. This generation of wear and heat requires periodic gap adjustment between the friction plates and the reaction members to keep the press operating correctly. The trip rate or cycle speed of a press equipped with a dry friction clutch/brake unit is limited because the mass of the unit determines its heat dissipation capacity. If the mass of the unit is increased to increase its heat dissipation capacity, the inertia that must be started and stopped is also increased. These factors define a closed loop from which it is impossible to escape when trying to increase the performance of the system.

Oil shear brake and clutch units have been developed to eliminate the problems associated with the dry friction type of units. The oil shear systems use hydraulic actuation instead of air actuation and the units have been developed with key modules which can be easily adapted to be mated with the various types of presses. Properly designed oil shear clutch/brake drives offer the advantage of little or no wear of plates in the disk stacks and no brake fade. This provides a more precise operation of the press and dramatically increases press up-time. The oil film between the adjacent disks carries the heat generated by the start-stops of the press away from the disk stacks. This removal of heat offers the advantage that there is now no practical limit in the press trip rate and the flywheel speed. In addition, this removal of heat provides unlimited inching capabilities.

While these oil shear clutch/brake drive units have significantly improved the operation of the presses, they have all experienced problems associated with the controlled coordination between the operation of the clutch and brake units. One problem associated with these prior art oil shear clutch/brake drives has been the inability to accurately control the amount of overlap between the operation of the brake unit and the operation of the clutch unit.

Some press applications require the operation of the clutch to be completely separate from the operation of the brake, thus eliminating all amounts of overlap between them. This elimination of overlap provides a dead zone in which the clutch is not engaged and the brake is not applied. When providing a dead zone, it becomes more and more difficult to meet the emergency stopping time requirements of the various safety standards because the system must pass through this dead zone to effect stopping of the press.

In addition to the problems related to emergency stopping time requirements, this elimination of overlap may also cause problems when it is desirable to inch through the stroke of the press without experiencing a backing up of the press. This backup of the press can occur as the clutch/brake drive units pass through this dead zone. In these applications, it becomes necessary to provide a certain amount of overlap between the operation of the clutch and the operation of the brake. While these applications require a small amount of overlap, it is imperative to accurately control the amount of overlap in order to maintain the operational life of the clutch/brake drive unit.

Accordingly, what is needed is a press drive system which incorporates the flexibility to be applied to a wider variety of presses where the amount of overlap can be accurately controlled to meet the specific requirements of the application.

SUMMARY OF THE PRESENT INVENTION

The present invention provides the art with a press drive system which uses an oil shear brake and an oil shear clutch drive. The clutch system of the present invention uses a disk stack of multiple disks and is located on one side of a flywheel. The brake system of the present invention also uses a disk stack of multiple disks and is located on the opposite side of the flywheel. The oil shear system of the present invention utilizes all the advantages associated with the oil shear technology while separating the brake and clutch units and placing them on opposite sides of the flywheel to minimize the amount of space required for the unit on any single side of the flywheel. This combination provides a unique oil shear clutch/brake unit which can be assembled to any press drive system utilizing a minimum amount of space. In addition, the separation of the two units provides the flexibility to design into the units the controlled coordination between the operation of the brake unit and the operation of the clutch unit to accurately provide specified amounts of overlap. The operation of the clutch and brake units and the control of the amount of overlap between them is accomplished utilizing a single valve.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out this present invention.

DETAILED DESCRIPTION OF THE PREFERRED EMBODIMENT

Figure 1:
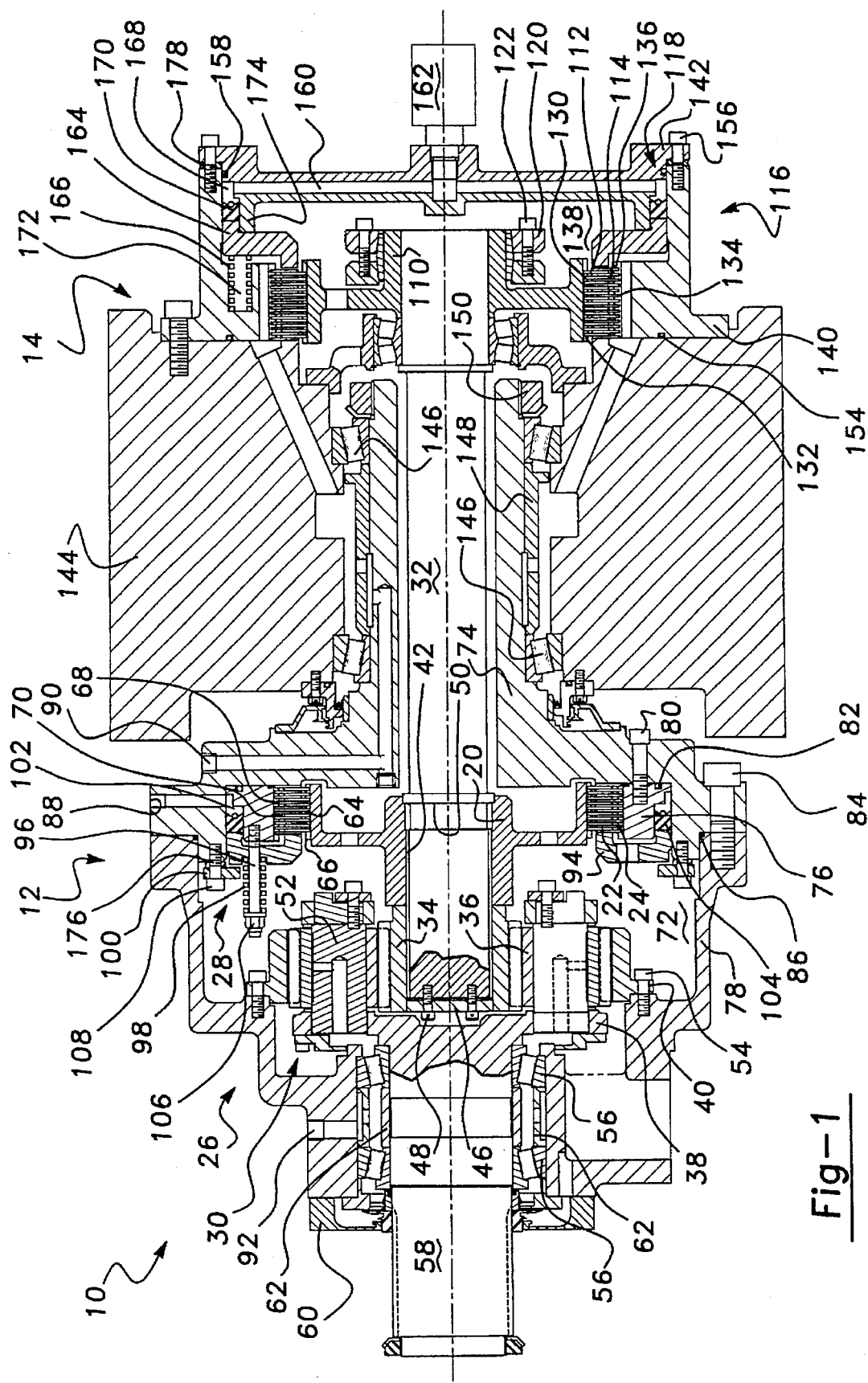
FIG. 1 is a side view, partially in cross section, of a brake and clutch unit in accordance with the present invention located on opposite sides of a flywheel.

Referring now to the drawing in which like reference numerals designate like or corresponding parts throughout the several views, there is shown in FIG. 1 a clutch/brake unit in accordance with the present invention which is designated generally by the reference numeral 10. The embodiment described below is being described for exemplary purposes only. The unique brake and clutch assemblies of the present invention can be incorporated into other designs of press drives if desired.

Referring now to FIG. 1, clutch/brake unit 10 includes a separate brake assembly 12 and a clutch assembly 14. Brake assembly 12 includes a brake reaction hub 20, a plurality of brake friction plates 22, a plurality of brake reaction plates 24, a brake housing assembly 26 and a brake engagement assembly 28. Brake reaction hub 20 is drivingly connected to a drive assembly 30. Drive assembly 30 is the output means for clutch/brake unit 10 and in the embodiment shown, drive assembly 30 comprises a drive shaft 32, a sun gear 34, a plurality of planet gears 36, a planetary carrier 38 and a ring gear 40. Drive shaft 32 defines a plurality of splines 42 which drivingly connect brake reaction hub 20 and sun gear 34 both of which include a plurality of splines which mate with splines 42. An end cap 46 is fixedly secure to drive shaft 32 using a plurality of bolts 48. End cap 46 in conjunction with a shoulder 50 on drive shaft 32 maintains the axial position of brake reaction hub 20 and sun gear 34.

Sun gear 34 meshingly engages the plurality of planet gears 36 which are rotatably disposed on a plurality of pins 52 fixedly secured to planetary carrier 38. In addition to sun gear 34, planet gears 36 meshingly engage ring gear 40. Ring gear 40 is fixedly secured to brake housing assembly 26 using a plurality of bolts 54.

Planetary carrier 38 is rotatably disposed with respect to brake housing assembly 26 by a pair of bearings 56. Planetary carrier 38 includes an output shaft 58 for drivingly engaging the working components of the press. A bearing retainer and seal assembly 60 in conjunction with a pair of spacers 62 maintain and position planetary carrier 38 with respect to brake housing assembly 26.

The plurality of brake friction plates 22 have spline means 64 located on their interior surface for engagement with spline means 66 disposed on the exterior of hub 20. This spline engagement between plates 22 and hub 20 is such that plates 22 and hub 20 will rotate together but plates 22 are allowed to move axially along spline means 66. Interjected or interleaved between the plurality of brake friction plates 22 are the plurality of brake reaction plates 24. Brake reaction plates 24 have spline means 68 located on their exterior surface for the engagement with spline means 70 disposed on the interior of housing assembly 26. This spline engagement between plates 24 and housing assembly 26 is such that plates 24 are prohibited from rotating with respect to housing assembly 26 but plates 24 are allowed to move axially along spline means 70 of housing assembly 26.

Housing assembly 26 in conjunction with drive assembly 30 defines an oil chamber 72. Housing assembly 26 includes a quill 74, a brake reaction member 76 and a housing cover 78. Housing assembly 26 is fixedly secured to a stationary member of the press (not shown) or any other non-moving member adjacent to the press. Brake reaction member 76 is fixedly and sealingly secured to quill 74 with a plurality of bolts 80 or by other means known well in the art. A seal 82 between quill 74 and reaction member 76 maintains the oil tightness of chamber 72. Reaction member 76 includes spline means 70, and positions spline means 70 generally co-axial with spline means 68 such that plates 24 and plates 22 are positioned in their interleaved relationship. Housing cover 78 is fixedly and sealingly secured to quill 74 using a plurality of bolts 84 or by other means known well in the art. A seal 86 between cover 78 and quill 74 maintains the oil tightness of chamber 72. Bearing retainer and seal assembly 60 are fixedly and sealing secured to cover 78. A fluid passage 88 extends through quill 74 to provide for the application and release of brake assembly 12 as will be described later herein. In addition, a fluid passage 90 extends through quill 74 and a fluid passage 92 extends through housing cover 78 to provide for the oil circulation through chamber 72 of brake assembly 12 as well as through clutch assembly 14 to provide lubrication and cooling to the components of clutch/brake unit 10.

Brake engagement assembly 28 is disposed within sealed chamber 72 defined by housing assembly 26 and drive assembly 30. Brake engagement assembly 28 comprises an application member 94, a plurality of studs 96, a plurality of springs 98 and an annular stop 100. Application member 94 is slidingly received over the plurality of studs 96 and moves axially along studs 96 in order to apply or release brake assembly 12. Application member 94 in conjunction with reaction member 76 and quill 74 of housing assembly 26 define an activation chamber 102. A seal packing 104 isolates chamber 102 from chamber 72 and chamber 102 is in communication with fluid passage 88 to provide for the application and release of brake assembly 12. Each spring 98 is disposed over a respective stud 96 and react against a nut 106 which is threadingly received on stud 96 to urge brake assembly 12 into its applied position. Brake assembly 12 is released by supplying pressurized fluid to chamber 102 to urge application member 94 against the load exerted by springs 98. Annular stop 100 is fixedly secured to quill 74 by a plurality of bolts 108 to limit the movement of application member 94.

The operation of brake assembly 12 begins with brake assembly 12 being in the engaged condition due to the biasing of application member 94 by the plurality of coil springs 98. Application member 94 compresses the plurality of friction plates 22 and the plurality of reaction plates 24 together and against quill 74. In this engaged position, rotation of drive shaft 32 is prohibited by the fact that brake reaction hub 20, which is locked to drive shaft 32, is locked to quill 74 of housing assembly 26 which is in turn secured to a stationary member. When it is desired to release brake assembly 12, fluid under pressure is supplied to chamber 102 through passage 88. Pressurized fluid within chamber 102 causes application member 94 to move axially to the left as shown in FIG. 1 against the biasing of coil springs 98. When application member 94 moves to the left, the compression between the plurality of friction and reaction plates 22 and 24, respectively, is released and plates 22 are free to rotate relative to plates 24 which allows drive shaft 32 to rotate. When the pressurized fluid is released from chamber 102, brake assembly 12 is urged into its applied condition due to the biasing of coil springs 98.

Clutch assembly 14 includes a clutch reaction hub 110, a plurality of clutch friction plates 112, a plurality of clutch reaction plates 114, a clutch housing assembly 116 and a clutch engagement assembly 118. Clutch reaction hub 110 is drivingly connected to drive shaft 32 of drive assembly 30. A compression ring 120 is secured to clutch reaction hub 110 using a plurality of bolts 122. Compression ring 120 drivingly secures clutch reaction hub 110 to drive shaft 32.

The plurality of clutch friction plates 112 have spline means 130 located on their interior surface for the engagement with spline means 132 located on the exterior surface of hub 110. This spline engagement between plates 112 and hub 110 is such that plates 112 and hub 110 will rotate together but plates 112 are allowed to move axially along spline means 132. Interjected or interleaved between the plurality of clutch friction plates 112 are the plurality of clutch reaction plates 114. Clutch reaction plates 114 have spline means 134 located on their exterior surface for the engagement with spline means 136 disposed on the interior of housing assembly 116. This spline engagement between plates 114 and housing assembly 116 is such that plates 114 are prohibited from rotating with respect to housing assembly 116 but plates 114 are allowed to move axially along spline means 136 of housing assembly 116.

Housing assembly 116 in conjunction with drive shaft 32 defines a sealed chamber 138. Housing assembly 116 includes a flywheel adapter plate 140 and a housing cover 142. Adapter plate 140 is fixedly secured to a flywheel 144 of the press to which brake/clutch unit 10 is being attached. Flywheel 144 is rotatably disposed with respect to quill 74 by a pair of bearings 146. Bearings 146 are positioned with respect to quill 74 by using a spacer 148 and a locknut 150 threadingly received on quill 74. A seal 154 between plate 140 and flywheel 144 maintains the oil tightness of chamber 138. Adapter plate 140 includes spline means 136 and positions spline means 136 generally co-axial with spline means 134 such that plates 114 and plates 112 are positioned in their interleaved relationship. Housing cover 142 is fixedly and sealingly secured to adapter plate 140 using a plurality of bolts 156 or by other means known well in the art. A seal 158 between cover 142 and adapter plate 140 maintains the oil tightness of chamber 138. A fluid passage 160 extends through housing cover 142 to provide for the engagement and disengagement of clutch assembly 14 as will be described later herein. A rotary union 162 is secured to fluid passage 160 to provide pressurized fluid to fluid passage 160 as is well known in the art.

Clutch engagement assembly 118 is disposed within sealed chamber 138 defined by housing assembly 116 and drive shaft 32. Clutch engagement assembly 118 comprises an application member 164 and a plurality of coil springs 166. Application member 164 is slidingly received within flywheel adapter plate 140 and moves axially within plate 140 to engage or disengage clutch assembly 14. Application member 164 in conjunction with adapter plate 140 and housing cover 142 define an activation chamber 168. A seal packing 170 isolates chamber 168 from chamber 138 and chamber 168 is in communication with fluid passage 160 to provide for the engagement and disengagement of clutch assembly 14. Each spring 166 is disposed within a respective pocket 172 formed in adapter plate 140 and react against adapter plate 140 to urge clutch assembly 14 into its disengaged position. Clutch assembly 14 is engaged by supplying pressurized fluid to chamber 168 to urge application member 164 against the load exerted by spring 166. An annular stop 174 located on housing cover 142 limits the travel of application member 164.

The operation of clutch assembly 14 begins with clutch assembly 14 being in the disengaged condition due to the biasing of application member 164 by the plurality of coil springs 166 to cause application member 164 to move away from friction plates 112 and reaction plates 114. In this disengaged position, flywheel 144 is free to rotate with respect to drive shaft 32 due to the fact that the plurality of friction plates 112 are free to rotate relative to the plurality of reaction plates 114. When it is desired to power drive shaft 32 by flywheel 144, fluid under pressure is supplied to chamber 168 through fluid passage 160. Pressurized fluid within chamber 168 causes application member 164 to move axially to the left as shown in FIG. 1 against the biasing of coil springs 166. When application member 164 moves to the left, the plurality of friction plates 112 are urged against the plurality of reaction plates 114 and against flywheel 144 causing engagement of clutch assembly 14 and the transferring of power from flywheel 144 to drive shaft 32. When the pressurized fluid is released from chamber 168, clutch assembly 14 is urged into its disengaged condition due to the biassing of coil springs 166.

Brake assembly 12 operates to stop drive shaft 32 from rotating with respect to flywheel 144 and clutch assembly 14 operates to cause drive shaft 32 to be rotated by flywheel 144. Because these operations are opposite to each other, it is necessary to accurately coordinate the application and release of brake assembly 12 with the engagement and disengagement of clutch assembly 14 to insure that the proper amount of overlap is provided between the two assemblies. The present invention provides the unique coordination of operation of brake assembly 12 and clutch assembly 14 by designing the two assemblies 12 and 14 such that the coordination of their operation is designed into the assemblies. The plurality of coil springs 98 and the plurality of coil springs 166 are designed to be generally identical in strength and number. Thus the urging force that applies brake assembly 12 and the urging force that disengages clutch assembly 14 is generally identical. In addition, the size and dimensions of chamber 102 are generally identical to the size and dimensions of chamber 168 to provide the same area upon which the pressurized fluid reacts. Thus when the same pressurized fluid is supplied to both chambers 102 and 168 simultaneously, brake assembly 12 will release simultaneously to the engagement of clutch assembly 14. In a similar manner, the disengagement of clutch assembly 14 and the application of brake assembly 12 will also occur simultaneously with the simultaneous release of pressurized fluid from chambers 102 and 168 and the reaction caused by springs 98 and 166.

When it is desired to accurately provide a specified amount of overlap between brake assembly 12 and clutch assembly 14, the biasing load which urges clutch assembly 14 into its disengaged position is reduced. This reduction in biasing load can be accomplished by reducing the strength of the plurality of coil springs 166 but the preferred method is to reduce the number of coil springs 166 such that brake assembly 12 is biased into its applied condition by more springs than clutch assembly 14 is biased into it disengaged position. This will result in a quicker engagement of clutch assembly 14 accurately providing overlap between the two assemblies.

In addition to controlling the biasing load between the two assemblies by varying the number of coil springs 166 of clutch assembly 14, it is necessary to accurately control the stroke of both application member 94 and application member 164. This stroke control is accomplished by providing the necessary thickness of shims 176 between annular stop 100 and quill 74 to control the stroke of application member 94 of brake assembly 12 and by providing the necessary thickness of shims 178 between flywheel adapter plate 140 and housing cover 142 to control the stroke of application member 164 of clutch assembly 14. The stroke of application members 94 and 164 are controlled such that the gap between adjacent interleaved plates of brake assembly 12 in its released condition is generally equal to the gap between adjacent interleaved plates of clutch assembly 14 in its disengaged condition. Thus, the stroke of application member 94 is preferably less than the stroke of application member 164 due to others being a fewer number of interleaved plates in brake assembly 12 when compared to the number of interleaved plates in clutch assembly 14 as shown in FIG. 1.

Shims 176 and 178 remove the normal build tolerances to provide accurate control over the strokes of application members 94 and 164. This in conjunction with controlling the biasing load of the brake assembly and the biasing load of the clutch assembly enable precise setting for the amount of overlap between brake assembly 12 and clutch assembly 14.

While the above detailed description describes the preferred embodiment of the present invention, it should be understood that the present invention is susceptible to modification, variation and alteration without deviating from the scope and fair meaning of the subjoined claims.

What is claimed is:

1. A brake/clutch drive unit comprising:

a stationary housing;

an output member rotatably mounted with respect to said housing;

a selectively operable brake disposed between said stationary housing and said output member, said brake being movable between an applied condition and a released condition;

a first plurality of springs for urging said brake into said applied condition;

an input member rotatably mounted with respect to said housing;

a selectively operable clutch disposed between said input member and said output member, said clutch being movable between an engaged position and a disengaged condition;

a second plurality of springs for urging said clutch into said disengaged condition; and means for controlling the operational timing of said clutch and said brake such that said brake is in said applied condition and said clutch is in said engaged condition simultaneously to provide a specified amount of overlap, said controlling means comprising said second plurality of springs being different in strength from said first plurality of springs.

2. The brake/clutch unit according to claim 1 wherein, said difference in strength is a result of said second plurality of springs being different in number from said first plurality of springs.

3. A method of controlling the operational timing between a brake and a clutch of a brake/clutch unit, said method comprising the steps of:

selectively moving said brake between an applied condition and a released condition;

urging said brake into said applied condition with a first plurality of springs to exert a first load;

selectively moving said clutch between a disengaged condition and an engaged condition;

urging said clutch into said disengaged condition with a second plurality of springs to exert a second load; and selecting said second load to be different from said first load to provide a specified amount of overlap due to the simultaneous engagement of said clutch and application of said brake.

4. The method according to claim 3 wherein, the step of selecting said first load to be different from said second load includes selecting said second plurality of springs to be different in number from said first plurality of springs.

* * * * *